H. KINSEY, F. W. KISSELL, J. E. & J. M. SMITH.
Hay Cutter.
No. 84,063. 
Patented Nov. 17, 1868.
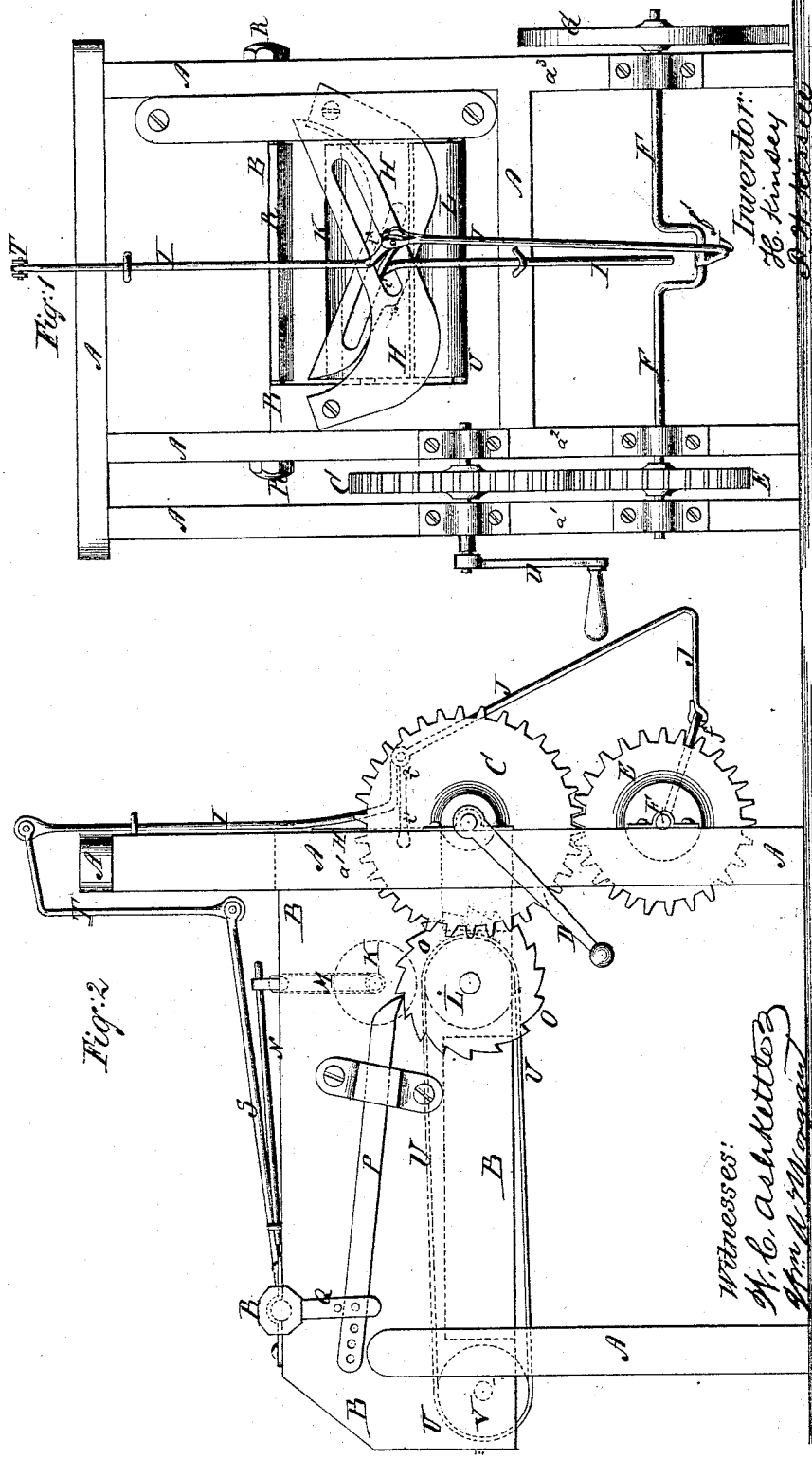

UNITED STATES PATENT OFFICE.

HENRY KINSEY, F. W. KISSELL, J. E. SMITH, AND J. M. SMITH, OF LIGONIER, PENNSYLVANIA.

IMPROVEMENT IN HAY-CUTTERS.

Specification forming part of Letters Patent No. 84,063, dated November 17, 1868.

*To all whom it may concern:*

Be it known that we, HENRY KINSEY, F. W. KISSELL, J. E. SMITH, and J. M. SMITH, of Ligonier, in the county of Westmoreland and State of Pennsylvania, have invented a new and useful Improvement in Hay-Cutter; and we do hereby declare that the following is a full, clear, and exact description thereof, which will enable others skilled in the art to make and use the same, reference being had to the accompanying drawings, forming part of this specification.

Figure 1 is a front view of our improved machine. Fig. 2 is a side view of the same.

Similar letters of reference indicate corresponding parts.

Our invention has for its object to furnish an improved machine for cutting hay, straw, and other fodder, which shall be simple in construction, easily operated, effective in operation, and self-feeding; and it consists in the manner in which the knives are constructed and operated, and in the construction and operation of the self-feeding device, the whole being constructed and arranged as hereinafter more fully described.

A is the frame of the machine, and B is the feed-box. C is a large gear-wheel, revolving in bearings in the uprights $a^1$ and $a^2$ of the frame A, and to the outer projecting end of the journal of which is attached the crank D, by which the machine is operated. The teeth of the gear-wheel C mesh into the teeth of the gear-wheel E, attached to the shaft F, which revolves in bearings attached to the uprights $a^1$ $a^2$ $a^3$ of the frame A, has a double crank, $f'$, formed upon it, and to its end is attached the fly-wheel G, as shown in Fig. 1. H are the knives, which are made curved, in about the form shown in Fig. 1, and are pivoted at their outer or curved ends to the frame A, or the forward end of the feed-box B, and their inner or free ends are slotted longitudinally, as shown in Fig. 1, to receive the arm by which the said knives are operated. The lower part of the forward end of the inner knife H is cut away, as shown in Fig. 1, to prevent the said part of the said knife from interfering with the operation of the rear part of the outer knife, only the outer or curved parts of said knives being designed to act as cutters, so that the entire cut may be made with a drawing movement of said knives. I is a rod or bar passing up vertically through keepers or guides attached to the frame A. The bar or rod I is made with two arms, $i^1$ $i^2$, upon its middle part, the arm $i^1$ projecting inward and passing through the slots in the forward or free ends of the knives H, so that as the rod I moves downward the knives H may be forced down to make the cut, and as the rod I moves upward the said knives will be raised ready to make another cut. J is a pitman, the upper end of which is pivoted to the outer end of the outwardly-projecting arm $i^2$ of the rod or bar I, and the lower end of which is pivoted to the double crank $f'$ of the shaft F. The lower part of the pitman J is bent, as shown in Fig. 2, so as to keep the said pitman J out of the way of the rod or bar I, as the machine is being operated.

K and L are the feed-rollers, which are placed the one directly above the other, and the journals of which revolve in bearings in the sides of the feed-box B. The journals of the upper roller K work in slots or grooves in the inner sides of the side boards of the box B, and are held down to their places by the sliding blocks M, upon the upper ends of which rest the free ends of the springs N, the other ends of which are secured to the upper edges of the said side boards of the feed-box B. This construction allows the upper roller to "give," to accommodate itself to the varying thickness of the material being fed to the knives. The lower roller L is so placed that its upper side may project a little above the bottom of the feed-box B, and to the projecting end of each of its journals is attached a ratchet-wheel, O, the teeth of which are operated upon by the sliding pawls P, which pass through keepers or guides attached to the side boards of the feed-box B, and the rear ends of which are adjustably pivoted to the lower ends of the arms Q, rigidly attached to the ends of the rock-shaft R. The shaft R works in bearings in the rear part of the upper edges of the side-boards of the box B, and to its middle part is rigidly attached a long arm, S, projecting forward, as shown in Fig. 2. T is a pitman, the lower end of which is pivoted to the forward end of the long arm S, and its upper end, which is bent forward, as shown in Fig. 2, and is pivoted to the upper end of the vertical sliding rod or bar I, so that the feed may be operated by the movement of the same bar that operates the knives. U is an endless belt or apron, made of canvas or other suitable material, and which passes around the lower feed-roller L, and around the roller V, pivoted to the rear part of the box B, so that the material to be cut may be carried forward to the feed-rollers to be fed forward by them to the knives H.

We claim as new, and desire to secure by Letters Patent—

1. The knives H, constructed and operating substantially as herein shown and described, and for the purpose set forth.

2. The combination and arrangement of the double crank $f'$ of the shaft F, bent pitman J, and vertical sliding rod or bar I, having arms $i^1$ $i^2$ formed upon it, with each other and with the slotted knives H, substantially as herein shown and described, and for the purpose set forth.

3. The combination and arrangement of the ratchet-wheels L, sliding-pawls P, short arms Q, rock-shaft R, long arm S, and pitman T, with each other and with the feed-rollers K L, and sliding rod or bar I, for the purpose of operating the said feed-roller from the said sliding bar I, substantially as herein shown and described.

HENRY KINSEY.
F. W. KISSELL.
J. E. SMITH.
J. M. SMITH.

Witnesses:
R. M. SMITH,
W. WALTER,
JAMES MOORE,
JOHN J. BOWSE.